Feb. 10, 1953 T. C. GERNER 2,627,732
REPLACEMENT BUSHING ASSEMBLY
Filed Dec. 30, 1946 3 Sheets-Sheet 1
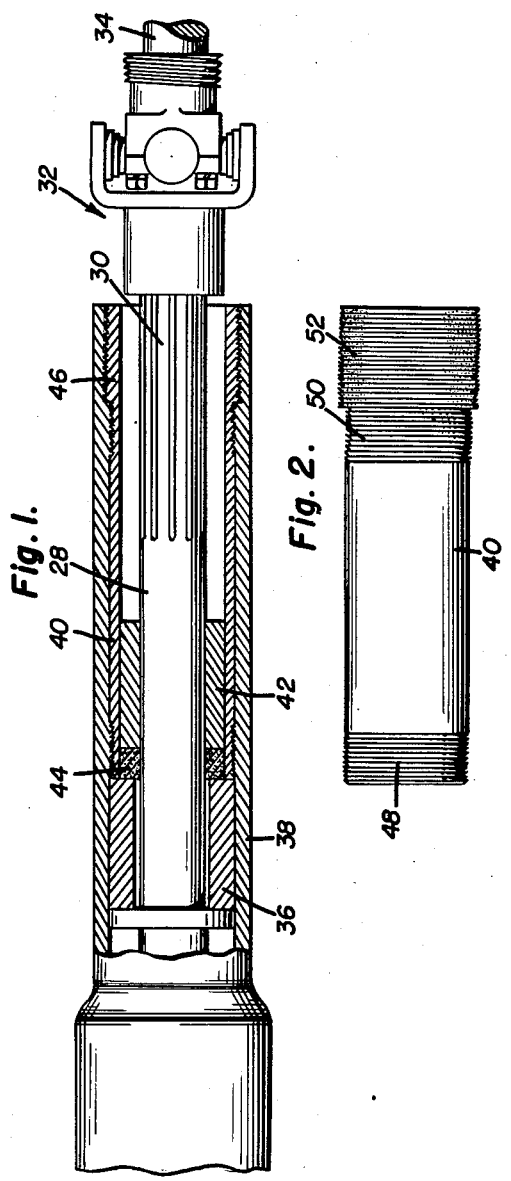
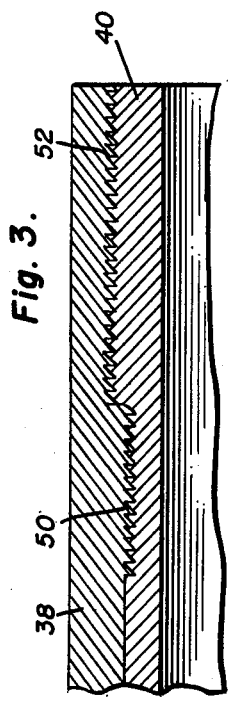
Inventor
Theodore C. Gerner
By *Clarence A. O'Brien and Harvey B. Jackson*
Attorneys

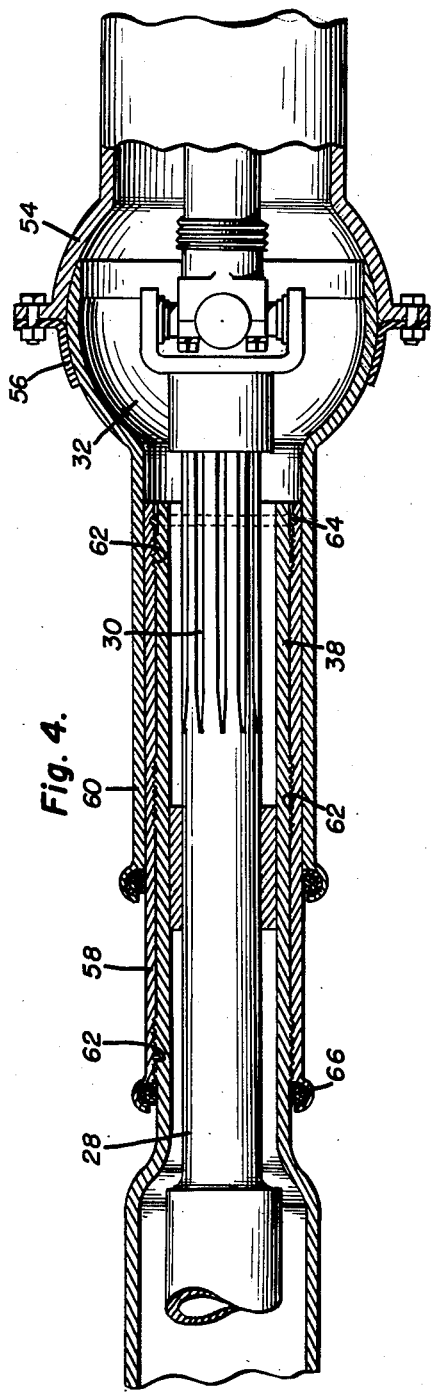

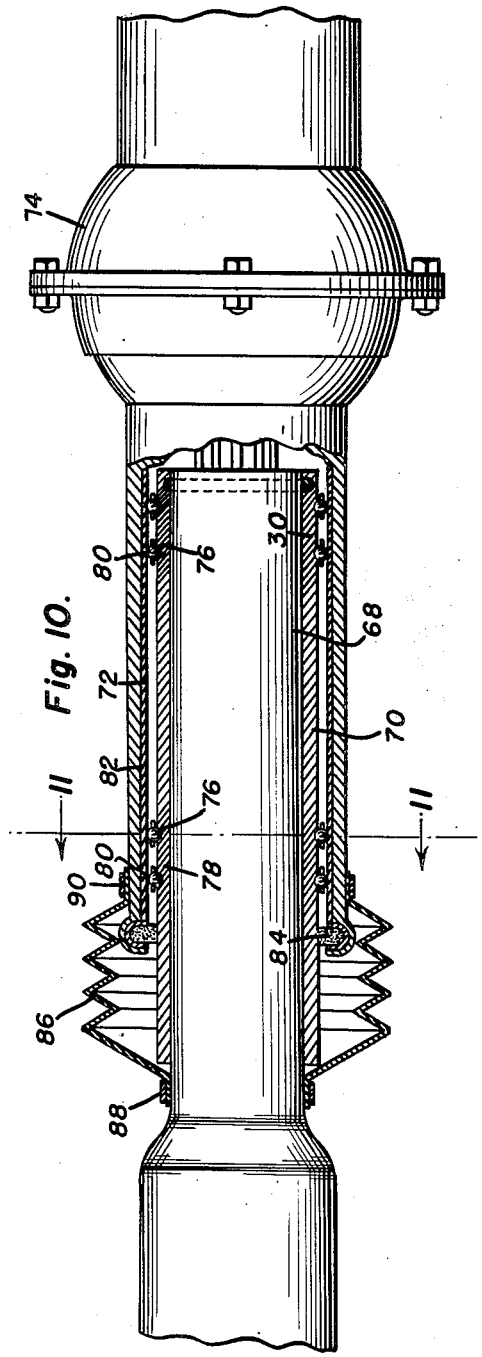

Patented Feb. 10, 1953

2,627,732

UNITED STATES PATENT OFFICE 2,627,732

REPLACEMENT BUSHING ASSEMBLY

Theodore C. Gerner, Oklahoma City, Okla.

Application December 30, 1946, Serial No. 719,319

2 Claims. (Cl. 64—1)

1

This invention comprises novel and useful improvements in a replacement bushing assembly and more specifically pertains to the replacement sleeve or bushing for renewing the worn bearing surfaces and is particularly characterized by a highly efficient retaining means permitting ready insertion of the replacement unit in or upon a worn bearing surface without necessitating prior machine treatment of said worn surface and by an improved bearing engagement for journaling the shaft or member carried by the worn bearing surface.

This invention pertains broadly to the repair of bearings and journals and is not limited to any particular type of bearing or use thereof, but in some aspects thereof constitutes an improvement upon my prior Patents No. 2,403,520 issued July 9, 1946 and No. 2,405,541 issued August 6, 1946.

The fundamental object of this invention is to provide a replaceable bushing assembly for restoring worn bearings to their original utility or to an improved effectiveness.

A very important object of the invention resides in providing in a bushing assembly of the character set forth above, highly efficient means for retaining the replacement unit in the worn bearing without necessitating any preliminary machine treatment of the worn bearing.

Another very important purpose of the invention resides in providing a bushing assembly in accordance with the foregoing objects, which may be quickly and easily installed, with a minimum expenditure of time and labor and is ideally adapted for installation by unskilled labor.

Still another important object of the invention is to provide a replacement assembly in accordance with the aforementioned objects and which may be utilized to produce a greatly improved anti-friction bearing between the original worn bearing and the member journaled thereby.

Still another important object of the invention is to effect a repair or restoration of worn bearings in accordance with the above set forth objects, which is an inexpensive construction, is so designed as to be readily modified to fit the varying requirements of variegated uses of bearings, is durable and dependable in its use, and may be rapidly and economically manufactured upon conventional industrial machines and by conventional methods.

These, together with various ancillary objects of the invention which will later become apparent as the following description proceeds, are realized by this invention, various embodiments

2 of which have been illustrated in the accompanying drawings, by way of example only, and wherein:

Figure 1 is a longitudinal sectional view showing the invention applied to a drive shaft bushing assembly in accordance with my prior Patent No. 2,403,520;

Figure 2 is an elevational view of one form of replacement bushing which may be employed in the assembly of Figure 1;

Figure 3 is an enlarged detail view of a portion of Figure 1, showing more clearly one form of novel fastening means in accordance with this invention;

Figure 4 is a longitudinal sectional view showing the application of the principles of this invention to the propeller shaft housing repair unit of my prior Patent No. 2,405,541 of August 6, 1946;

Figure 5 is a view partly in elevation and partly in longitudinal section, illustrating the principles of the invention applied to a repair bushing of general application;

Figure 6 is a detail view in vertical longitudinal section, illustrating a modified application of the fastening means of the invention for attaching a bushing to a worn bearing surface;

Figure 7 is a view similar to Figure 6 but showing another modified form of fastening means;

Figure 8 is an end view of a slight modification of Fig. 7;

Figure 9 is a fragmentary detail view in longitudinal section, showing in an exaggerated manner a modified construction of fastening means for the bushings;

Figure 10 is a view similar to Figure 4 but showing a further modification of the invention of my prior Patent No. 2,405,541 in accordance with another principle of this invention;

Figure 11 is a vertical sectional view taken substantially upon the section line 11—11 of Figure 10; and Figure 12 is a fragmentary sectional view similar to Figure 10 but showing a further modification of the principles of the invention.

In repairing worn bushings or bearings in accordance with previous conventional practice, it has heretofore been necessary to either remove the worn bearing if employed in the form of a detachable bearing insert, or to drill out the worn bearing to a predetermined over-size and either insert a bushing therein or replace the conventional member journaled in the bearing with an over-size member in accordance with the enlarged diameter thereof. Where a replaceable bearing insert has been removed for inserting a new bearing, it has usually been found necessary to ream out or machine the new bearing to the desired diameter in order to remove the deformation usually accompanying the forcible insertion of the bearing replacement unit into the worn bearing.

In practically all cases, it has been necessary to expend considerable time and require the use of special tools or machines for restoring the worn bearing to its original effectiveness, and often this restoration of the bearing surfaces was attended by a protracted period of idleness of the machine in order to effect the more or less expensive repairs and replacements. The direct attachment of a replacement bushing or sleeve to the worn bearing surface in order to quickly and chiefly effect a repair thereof, has heretofore been unsuccessful because of the difficulty of securing a satisfactory seating engagement or fastening engagement of the replacement unit upon and throughout the unevenly worn surface.

These difficulties have been overcome by applying deformable ridges or protuberances upon the surface of a repair unit whereby the latter may be forcibly applied to a worn bearing surface, these deformable ridges being so proportioned as to readily shear over or conform to the irregularities of the worn bearing surface while their unsheared portions form and provide a tight and snug-fitting engagement therewith. Attention is now directed first to the basic principles of applying this principle as exhibited in Figures 5-9.

It should be noted that although the preferred use of the invention is with cylindrical bushings and bearings replacements, the many features of the invention as set forth in the following specification and illustrated in the drawings, are not limited thereto but may readily be applied to various shapes of bushings and even upon members which have integral bearings in or upon their surfaces.

As shown in Figure 5, a bushing or sleeve 10 is provided upon its internal and or external surfaces with a plurality of ridges 12 and 14, respectively, these ridges extending throughout any portion of the length of the sleeve or if desired throughout various longitudinally spaced zones thereon. If desired, these ridges or protuberances may be formed by merely grooving the internal or external surface of the sleeve, or by forming portions of enlarged or reduced diameters thereon or therein and providing the ridges upon the surfaces of these portions.

These deformable ridges are preferably cut directly into the surface or material of the sleeve 10, but may of course be readily applied thereto in the form of detachable inserts therein or thereon.

As shown at 16 in Figure 5, a portion of the external surface of the sleeve 10 is of enlarged diameter, and is provided with a plurality of ridges 14 which ridges as clearly shown, are of a diameter extending beyond and greater than that of the cylindrical surface of the member 10.

The deformable ridges as shown in the arrangement of Figure 5, whether interior or exterior of the sleeve 10 are adapted to longitudinally slide upon or within a worn bearing surface which it is desired to restore to normal condition and the appropriate ridges 12 or 14 which are shown as extending circumferentially about the surfaces of the replacement sleeve will be deformed by relative longitudinal movement of the sleeve upon the worn bearing surface. As shown by the embodiments of Figures 6 and 7, the deformable ridges may conveniently be disposed as spiral projections 18 upon either the interior or exterior surface of the sleeve as desired, or may be even longitudinally disposed as at 20 in Figures 7 and 8. As shown best at 22 in Figure 8, the interior surface of the sleeve 10 may be provided with a zone of smaller internal diameter than the rest of the sleeve, upon which zone, or if desired a plurality of longitudinally spaced zones, the deformable ridges 20 are cut.

It will be readily apparent that the deformable elements need not necessarily be in the form of continuous ridges, but if desired may consist of a plurality of protuberances or projections from the surface of the replacement bushing adjacent to the worn surface of the bearing with which the unit is to be employed. Further, the ridges may be formed as a continuous thread, such as a screw-thread, or may be effected as a series of parallel or equi-distantly spaced annular rings or the like. In all of the many forms of applying this principle, it is only necessary that deformable projections shall be provided upon the surface of the replacement unit, which projections may be swaged or sheared over as the unit is forced upon the worn bearing surface. For this purpose therefore, the overall diameter of the unit and its deformable projections will necessarily be somewhat greater than the various diameters of the worn bearing surfaces, in order that the material of the protuberances fully fill up the cavities and clearances left by the attrition of wear upon the worn surfaces.

For convenience of illustration, the deformable ridges have been shown in Figures 5-8 as having sharp edges. However, it will usually be found preferable to form these ridges with a contour approximating that of a sine curve as shown in Figure 9. Thus, the ridges 24, whether formed upon the interior or exterior surface of the replaceable sleeve bushing, are provided with rounded peaks 24 spaced by rounded valleys or grooves 26, the proportion and spacing of these elements being so arranged that when the peaks are sheared off there will be space to receive the displaced metal in the valleys. As will readily be understood, as the bushing is forced into or over a worn bearing, the relatively high spots of the worn bearing surface will roll over or shear off the relatively weak portions of the ridges or peaks 24, and force the displaced metal into the valleys or channels 26, leaving the unsheared parts of the ridges 24 to form a tight press fit with the worn surfaces of the worn bearings and in some instances will supplement this engagement by the accumulation of sheared off material retained in the valleys or grooves 26, thereby attaining a firm, secure and uniform engagement of the replaceable bushing throughout the length of the worn bearing, and this regardless of irregularities of wear in the worn bearing surface.

Thus, a replacement sleeve in accordance with the foregoing principles will readily accommodate itself to all inequalities of wear of a worn bearing surface and readily secure a new bearing surface in position without the necessity for regrinding, rebushing, or otherwise treating the worn surface. Further, it should be noted that a relatively small force is necessary to force the replacement unit into or upon a worn bearing surface, since the deformable protuberance will yield to repeated light blows as the unit is driven home, thereby eliminating the usual deformation of the sleeve as it is driven home.

Attention is now directed to the application of the above features of the invention to the drive shaft bushing assembly of my prior Patent No. 2,403,520.

As set forth in said patent, the propeller shaft of an automobile vehicle, indicated at 28 in Figure 1, is conventionally splined at its forward end as at 30 to receive the internally splined portion of a universal joint member indicated generally at 32, which latter is connected to the conventional engine driven power take-off shaft 34 extending from the rear of a transmission housing, not shown. The forward end of the propeller shaft 28 is customarily journaled in a bushing 36 which is carried by the forward end of a torque tube or propeller shaft housing 38. Since there is relative vibration, reciprocation and oscillation of the propeller shaft 28 in the journal 36, wear usually develops in the journal 36 to such an extent that the worn surface thereof will no longer adequately journal and support the propeller shaft 28 within the housing 38. In my prior patent above identified, a unitary bushing replacement assembly was inserted in the forward end of the torque tube 38 for providing a new propeller shaft journal to properly center and support the propeller shaft 28.

This assembly comprises a sleeve 40 having a replacement bushing 42 secured at the inward portion thereof, this replacement bushing being adapted to engage the unworn portion of the propeller shaft 28 immediately beyond that portion which was worn together with the cylindrical surface of the journal 36. Suitable packing and oil sealing means 44 were disposed at the forward extremity of the sleeve 40 and adapted to prevent the passage of oil from the differential housing of the vehicle up the torque tube and pass the replacement journal 42, this being effected by driving the bushing 40 into endwise engagement with the orginal bushing 36. At its other extremity, the replacement sleeve 40 usually carried an enlarged diameter portion 46 adapted to seat in a corresponding counterbore at the forward extremity of the torque tube. In applying the improvements of the instant invention to this construction, deformable ridges or protuberances 48 and 50 are formed upon the external surface of the sleeve 40 at its inner and outer extremities as shown in Figure 2, and also similarly deformable ridges 52 are provided upon the enlarged portion 46 thereof. As will be readily understood from Figures 1 and 3, the replacement sleeve 40, after removal of the universal joint 32 from the splined end 30 of the propeller shaft, is inserted and driven into the exterior open end of the torque tube 38 until the same is seated as shown in Figure 1. As will be readily understood in this embodiment of the invention, the deformable ridge areas 48, 50 and 52 will be of slightly greater diameter than the corresponding inner surfaces of the torque tube 38 which they are intended to engage, since these portions of the torque tube 38 are unworn surfaces and will, therefore, receive a sleeve 40 of corresponding uniform diameter. It will thus be seen that the successive deformable ridged portions of the replacement sleeve 40 provide an easily applied and thoroughly reliable fastening means for securing the replaceable bearing member 42 in operative position in the worn propeller shaft housing assembly.

Attention is next directed more specifically to the manner of applying the improvements of this invention to the construction of the replacement of my prior Patent No. 2,405,541 of August 6, 1946.

In this modification, the propeller shaft 28 is splined as at 30 to a universal joint 32 positioned in a conventional bell housing 54. The forward end of the torque tube 38 is customarily received in longitudinally slidable position in a telescoping sleeve, not shown, which is swivelly mounted in the spherical end of the bell housing 54 and retained therein by an annular gland 56. The engagement between the forward end of the torque tube 38 and the above mentioned telescoping sleeve, was subject to both reciprocation and vibration under the normal use of the automotive vehicle, resulting in considerable wear between the engaging surface of both torque tube and telescoping sleeve. In my above identified application, a repair unit was provided for reconditioning these worn surfaces, without dismantling the torque tube from the vehicle, by providing a pair of telescoping sleeve members 58 and 60, respectively engaging the torque tube worn external surface and the spherical seat within the bell housing 54. In the construction of said prior patent, the interior sleeve 58 was rigidly attached to the torque tube housing 38 and had a snug fitting engagement with the unworn portion of the external surface of said torque tube, and had a snug sliding engagement with the external sleeve 60 carried within the bell housing 54 in the conventional manner. By this means a renewed journal was established between the torque tube housing and the bell housing which restored the parts to their original efficiency and obviated the clearance occasioned by undue wear therebetween. For a fuller explanation of the operation of this attachment, attention is directed to my above identified patent.

In accordance with the principles of this invention, the interior sleeve 58 of this attachment is provided with one or more deformable ridges 62 over a portion or all of the internal cylindrical surface of the member 58. As will be readily understood, the ridged portions 62 which are adapted to engage the unworn portion of the torque tube 38, are formed upon the internal surface of member 58 which is of but slightly greater diameter than that of the external surface or torque tube 38; while the ridges 62 adapted to engage the worn portion of the torque tube housing 38, will necessarily be formed upon the inner circumference of a portion of the sleeve 58 which is of reduced internal diameter, in order to extend within the worn portions of the torque tube and compensate for the inequities of wear therein.

By this means, a tight press fit may be established between the replacement sleeve 58 and the torque tube 38, at one or more zones upon the exterior surface of the latter, to thereby prevent the leakage of oil or grease from the universal joint between the torque tube and the replacement sleeve, and also to give a firm and rigid fastening engagement between these members.

To further enhance the sealing relation, suitable packing rings 64 and 66 are provided in annular channels or grooves within the bore of the sleeve 58.

The operation of this form of the device is identical with that set forth in my prior patent, together with the improvements effected by my novel fastening means.

Attention is now directed to another embodiment of the invention, shown in Figures 10 and 11, the usefulness of this embodiment being illustrated in connection with an attachment in accordance with my aforementioned Patent No. 2,405,541. In this form of the invention, a worn bearing surface such as the worn end of a torque tube 68 has a sleeve 70 applied thereto in the same manner as described in connection with Figure 4 while a telescoping replacement sleeve 72 is secured in the customary bell housing 74 and is slidable upon the sleeve 70. For convenience of illustration, the deformable ridges or threaded protuberances are not shown in Figures 10 and 11, it being understood that these elements will be used where desired. In accordance with this feature of the invention, an anti-friction bearing means is employed between the sleeves 70 and 72 in order to minimize wear therebetween, and to facilitate their necessary relative movement during the operation of the device in a motor vehicle. Accordingly, the exterior surface of sleeve 70 is provided with a plurality of annular grooves or race-ways 76 which, if desired, may be formed in hardened surface portions 78 of the sleeve 70 and which receive anti-friction rolling elements 80 which may be ball bearings as shown, or if preferred or needle or roller bearing construction. The outer race of this ball bearing or anti-friction bearing assembly is composed of a liner 82 preferably of hard material and which is secured in any suitable manner such for example, as by the deformable ridges aforementioned, in tight fitting engagement within the inner cylindrical surface of the outer sleeve 72.

By the foregoing construction there is provided a replacement bearing assembly which will restore a worn bearing to its original operative condition and is adapted to minimize wear and reduce friction between the bearing surfaces as above set forth. Preferably at the outward end thereof, the outer sleeve member 72 and the liner 82 are provided with internal grooves or channels receiving a sealing element 84 adapted to have sliding and oil seating engagement between the sleeve 72 and the bushing 70.

In order to further prevent leakage of oil or the like through the assembly, and to prevent the ingress of dust, or the like, from detrimentally effecting the anti-friction bearings, a telescoping collapsible housing or casing 86 is provided whose ends are rigidly connected as at 88 and 90 by suitable clamps to the exterior surface of the torque tube 68 and the outer replaceable sleeve element 72. As will be readily seen from Figure 10, the housing 86 is adapted to have longitudinal movement as the bearing assembly expands or contracts longitudinally.

A somewhat simplified modification of the disclosure of Figure 10 is shown in Figure 12. The torque tube 92 is fitted with a replacement bushing or sleeve 94 as in the preceding embodiment, which likewise may be provided with the deformable fastening ridges above mentioned but not shown, and which has telescoping engagement within an outer sleeve 96 corresponding to the sleeve 72 of Figure 10. In this modification, suitable detachable bearing assemblies 98 which may be ball bearing, needle bearing or roller bearing as preferred, are removably inserted between the telescoping sleeves 94 and 96. A telescoping collapsible housing 100 having an end secured to the outer sleeve 96 as at 102, is adapted to provide a dust-proof cover for the assembly in the same manner as in Figure 10. This embodiment corresponds to that of Figure 10, except that a simplified and less expensive anti-friction bearing structure is provided between the slidable inner and outer sleeve members.

It should be particularly noted that although the embodiments of Figures 4, 10 and 12 have been illustrated in connection with repairing a worn propeller shaft housing of an automotive vehicle, their principles of construction and operation are equally applicable to various other bearing assemblies whereby they possess the joint function of replacing worn bearing parts to either their original or a modified diameter, and also introduce the advantages of an anti-friction bearing construction in the replacement unit.

Since various embodiments will readily occur to those skilled in the art it is not desired to limit the invention to the exact constructions shown and described, but all suitable modifications of the principles of the invention may be resorted to within the scope of the appended claims.

What is claimed as new is as follows:

1. A repair unit for a propeller shaft housing including a bushing of uniform external diameter engageable upon the worn portion of a propeller shaft housing, fastening means for securing said bushing upon the worn portion of said housing, and a sleeve engageable with a universal joint housing and journaled upon said bushing, said fastening means including internal deformable ridges on said bushing for press fit engagement with said propeller shaft housing at a plurality of longitudinally spaced zones thereon.

2. The combination of claim 1 wherein said plurality of longitudinally spaced zones includes a zone adjacent each end of said bushing and a zone intermediate the ends of said bushing.

THEODORE C. GERNER.

REFERENCES CITED

The following references are of record in the file of this patent:

UNITED STATES PATENTS

| Number | Name | Date |
| --- | --- | --- |
| 868,875 | Latcher | Oct. 22, 1907 |
| 1,928,841 | Morse | Oct. 3, 1933 |
| 2,147,343 | Hokanson | Feb. 14, 1939 |
| 2,403,520 | Gerner | July 9, 1946 |
| 2,405,541 | Gerner | Aug. 6, 1946 |